Nov. 8, 1927.
C. O. JOHNSON
1,648,310
HIGHWAY MAINTAINER
Filed Oct. 2 1926
2 Sheets-Sheet 1
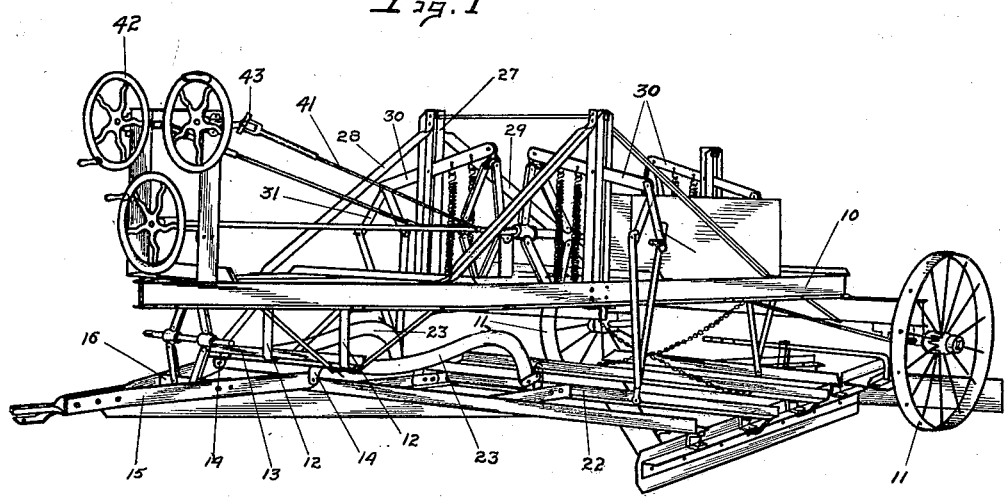
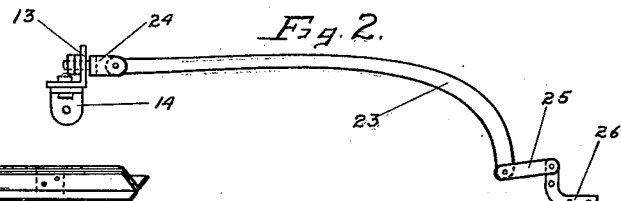
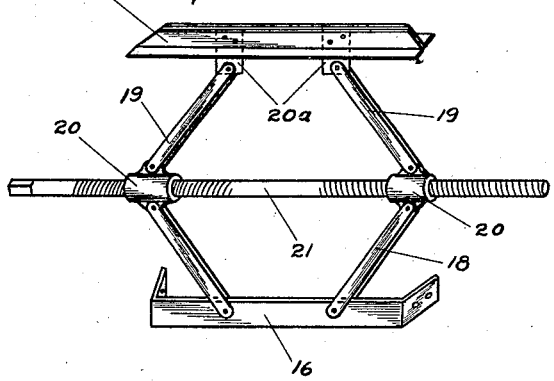
Inventor
C. O. JOHNSON.
By Emil F. Lange
Attorney

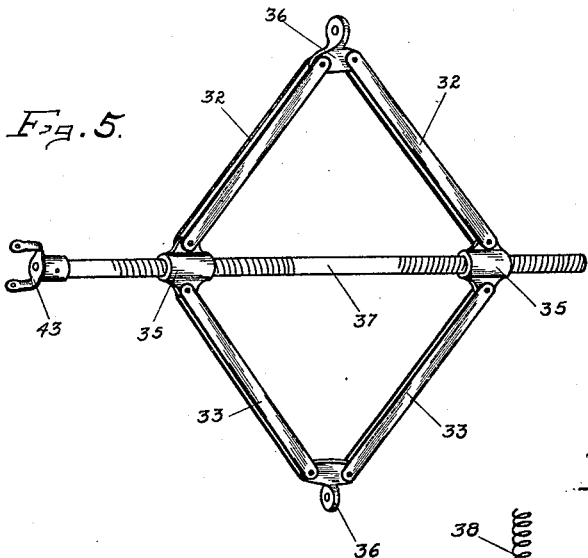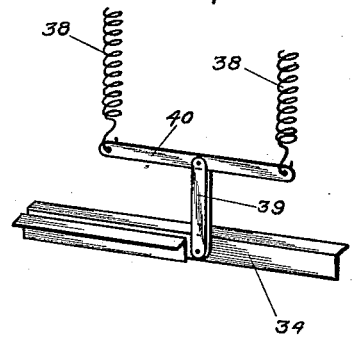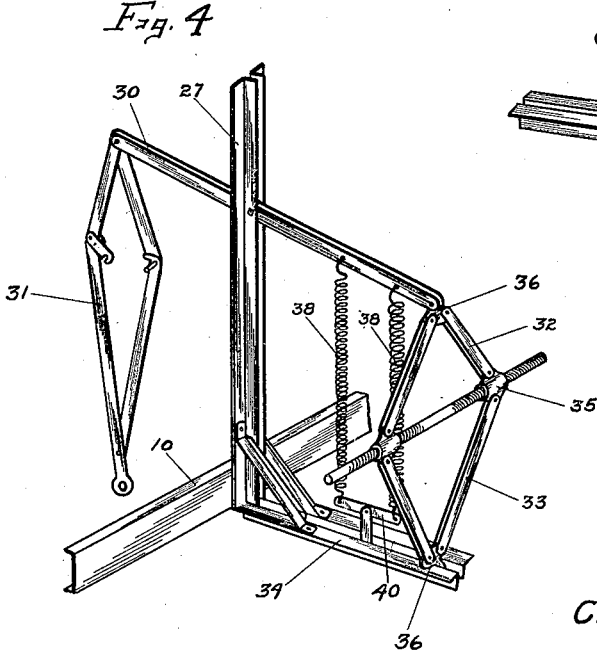

Patented Nov. 8, 1927.

1,648,310

UNITED STATES PATENT OFFICE.

CARL O. JOHNSON, OF LINCOLN, NEBRASKA, ASSIGNOR TO HIGHWAY MAINTAINER COMPANY, OF HAVELOCK, NEBRASKA, A CORPORATION OF NEBRASKA.

HIGHWAY MAINTAINER.

Application filed October 2, 1926. Serial No. 139,145.

My invention relates to highway maintainers for repairing and keeping in repair graded highways and other roads and it has among its objects the following:

The provision of a wheeled frame which supports a scraper of heavy design, the scraper being either floating or rigid in relation to the wheeled frame, at the option of the operator, and in which the scraper may be variously adjusted with reference to the horizontal, the adjusting mechanism being designed for the greatest possible ease and convenience.

The provision of a wheeled frame carrying a scraper, the wheeled frame having novel means at its forward end for securing it to a tractor and being adjustable in height.

The provision of a tractor drawn highway maintainer of such construction that the driver of the tractor may make all adjustments of the implement without leaving his position on the platform of the tractor and without stopping the tractor.

Having in view these objects and others which will be mentioned in the following description, I will now refer to the drawings in which Figure 1 is a view in perspective of the highway maintainer.

Figure 2 is an elevational view of the goose neck lever and its connections.

Figure 3 is a perspective view illustrating the mechanism for adjusting the draft device with reference to the tractor.

Figure 4 is an illustration of one of the three devices on the highway maintainer for suitably tilting or leveling the scraper.

Figure 5 is an illustration showing the details of the quadrilateral lever arrangement for lifting and lowering the scraper.

Figure 6 is a view in perspective showing the connections of the counter-balancing springs with the vehicle frame.

The vehicle frame comprises a pair of heavy channel beams 10 which are united at the forward extremities and forming a more or less V shaped structure in its general outlines. The frame is heavily braced in all directions, but since the frame in itself is not a part of my present invention, details of its bracing will be omitted. The frame is supported at its rear on a pair of supporting wheels 11, the forward portion of the frame being supported on the tractor.

Depending from the vehicle frame are several arms 12 which support a transverse bar 13 at their lower ends. This bar is preferably made from heavy angle iron and it sustains a portion of the weight of the vehicle and all of the traction of both the vehicle and the scraper. Depending from the bar 13 are yokes 14 for pivotally receiving the ends of a V-shaped draft device 15 as shown in Figure 1. This draft device is provided with a transverse brace 16 and the vehicle frame is provided with a somewhat similar brace 17. Two pairs of double links 18 and 19 are secured to the braces 16 and 17 respectively into a quadrilateral form. The links 18 are secured directly to the brace 16 while the links 19 are secured to the lugs 20ª depending from the brace 17. The links 18 and 19 are joined together by means of collars 20, these being internally screw threaded for receiving the screw 21 with opposite pitched portions so that when the screw 21 is turned the collars 20 will be forced either toward or away from each other. This, of course, lowers or raises the forward end of the draft device 15 to its most convenient position for the particular tractor which is to draw the highway maintainer.

The scraper is designated by means of the general numeral 22. It is secured to the vehicle frame both for traction and for adjustment. The traction is applied through the goose neck levers 23 which are secured at the forward extremities to the transverse bar 13 by means of the yokes 24. At the rear end of the goose neck lever is a link 25, this link being adjustably secured to the upturned extremity of a bar 26. The bar 26 is firmly secured to the scraper frame. The goose neck lever is pivotally connected to both the yoke 24 and the link 25, the link 25 being both pivotally and adjustably connected to the bar 26. By means of this construction the scraper will not only be drawn over the surface of the road but a certain downward thrust will be imparted to the scraper through the traction. This downward thrust may be varied through the adjustment between the link 25 and the bar 26.

Means are provided for giving any desired tilt to the scraper. For this purpose adjustable lifting devices are provided at the opposite sides and at the rear of the vehicle frame and they are all controlled by the driver of the tractor from his position on the tractor platform or seat. These three devices are substantially identical in construction and operation so that the description and illustration of one will explain the other two as well.

Referring now to Figure 4 in connection with Figure 1, there is shown a standard 27 which is secured to one of the channel beams 10, the standard being heavily braced at 28 and 29. The standard 27 is preferably in the form of a bar of angle iron as shown in Figure 4. Between these angle irons and pivoted thereto is a pair of double levers 30. A quadrilateral link arrangement 31 is secured to the lever 30 at its outer end and to the side of the scraper frame, all of the connections being pivoted. It should be noted that the construction includes means for locking the lever arrangement so as to make the connection between the scraper and the vehicle frame rigid, the scraper having otherwise a floating relation with respect to the vehicle frame when the latch is released. This construction is, however, fully described in my prior Patent No. 1,595,553 so that a full description at the present time is unnecessary. At the inner end of the lever 30 is a lever arrangement similar to the quadrilateral lever arrangement for adjusting the height of the draft device, as shown in Figure 3. This lever arrangement is clearly shown in Figure 5 and is shown in its relation to the rest of the lifting mechanism in Figure 4. In general the links 32 and 33 are pivotally secured in quadrilateral relation to the lever 30 and to a transverse brace 34 of the vehicle frame. The links 32 and 33 are secured to each other by means of collars 35 having ears, the collars 35 being similar to the collars 20. They are connected to the lever 30 and to the brace 34 respectively by means of castings 36 which have the form clearly shown in Figure 5. The casting 36 is provided with three pivot apertures, two of which are parallel to each other while the third is perpendicular to the other two, all three being horizontal when the casting is in place. The links 32 and 33 are each connected at one end to a casting 36 and at the other end to a sleeve 35 thus forming a flexible quadrilateral. It will be obvious that when the sleeves 35 are forced away from each other or toward each other the lever 30 will be positively actuated in one direction or the other. For thus forcing the collars 35 toward or away from each other I have provided a screw 37 passing through a pair of collars 35, the collars 35 being internally screw threaded. The screw 37 has two threads of opposite pitch, one at each end portion of the screw.

The scraper is designed for heavy duty work and is necessarily of strong and very heavy construction. The weight of the scraper would be such as to make the adjustment about the levers 30 very difficult. For this reason I have provided a pair of counterbalancing springs 38 which are arranged in the manner shown in Figures 4 and 6. The link 39 is pivotally secured at its lower end to the base 34 and at its upper end it has pivoted thereto a lever 40 extending in both directions from the pivot point. The counterbalancing springs 38 are secured to the lever 40 at its ends and to the lever 30 in the relative position shown in Figure 4. The actuation of the screw 37 thus varies the tension of the two springs 38, the tension of the two springs being unequally increased and decreased as the screw 37 is actuated. I am aware that counterbalancing springs have been used frequently in connection with the lifting and lowering mechanism of various implements but so far as I am aware the counterbalancing spring has always been single. I have also found that such a single counterbalancing spring in the heavy type highway maintainers does not produce as satisfactory a counterbalancing effect as the spring arrangement above described and I also find that such a single spring is apt to be very short-lived. With my arrangement the weight of the scraper is so delicately balanced by the counterbalancing springs that the scraper may be lifted or lowered by manipulating the wheels with one finger. This is an important feature since the lifting mechanism is designed to be operated by the driver of a tractor who is apt to have his attention fixed largely on the tractor.

The lifting mechanism as above described is applied at three places on the implement, two of which are at the sides and the other at the rear so that any desired tilt in the implement may be obtained by the use of one or more of the lifting and lowering devices. In order to make all three of the lifting and lowering devices readily accessible to the driver of a tractor I have provided connections which are positioned at the extreme front end of the implement frame and in close proximity to the seat or platform of the tractor. The screw 37 is connected to a shaft 41, this shaft being in turn connected to a shaft which is fixed to the hand wheel 42. The shaft 41 is provided at both of its ends with universal joints 43. The three lifting and lowering mechanisms differ in no respects from each other except in the fact that the shaft for operating the rear lifting and lowering mechanism is not provided with universal joints.

Having thus described my invention in such full, clear, and exact terms that its construction and operation will be readily understood by others skilled in the art to which it pertains, what I claim as new and desire to secure by Letters Patent of the United States is:

1. A highway maintainer including a wheeled frame and a scraper flexibly connected to said wheeled frame, means for vertically adjusting said scraper, said means including a lever pivotally secured to said vehicle frame at an elevated point, four links pivotally connected together in end to end relation in quadrilateral form, said links being connected at diagonally opposite pivot points to said lever and to said wheeled frame, means for flexing said links toward and away from each other to actuate said lever, a connection between said lever and said scraper whereby the actuation of said lever raises or lowers said scraper, said connection being normally flexible to permit said scraper to adapt itself to the irregularities of the surface of the road, and means for making said connection rigid.

2. A highway maintainer including a vehicle frame and a scraper flexibly connected thereto, means for vertically adjusting said scraper with reference to said vehicle frame, said means including a lever pivotally secured to said vehicle frame at an elevated point, four links pivotally connected together in end to end relation in quadrilateral form, said links being connected at diagonally opposite pivotal points to said lever and to said vehicle frame, means for flexing said links toward and away from each other to actuate said lever, counterbalancing means on said lever, and a connection between said lever and said scraper whereby the actuation of said lever raises or lowers said scraper.

3. A highway maintainer including a vehicle frame and a scraper flexibly secured thereto, a standard on said vehicle frame, a lever pivotally secured at an intermediate point to said standard at the upper extremity thereof, two pairs of links pivotally connected together in quadrilateral form, each of said pairs of links being pivotally secured to said lever and to said vehicle frame respectively, collars pivotally connecting the links of each of said pairs of links, said collars being internally screw threaded, a bolt having a pair of oppositely pitched screw threads thereon, said bolt passing through both of said collars, a pair of counterbalancing springs connecting said lever to said vehicle frame, and a connection between said lever and said scraper whereby the actuation of said links causes said lever to move about its pivot to raise or lower said scraper.

In testimony whereof I affix my signature.

CARL O. JOHNSON.